United States Patent
Christiansen et al.

(10) Patent No.: US 7,459,001 B2
(45) Date of Patent: Dec. 2, 2008

(54) VANE DIFFUSER

(75) Inventors: Bjorn Christiansen, Trondheim (NO); Knut Sveberg, Trondheim (NO); Inge Hjelkrem, Trondheim (NO); Dag Kvamsdal, Trondheim (NO)

(73) Assignee: Natco Norway AS, Trondheim (NO)

( * ) Notice: Subject to any disclaimer, the term of this patent is extended or adjusted under 35 U.S.C. 154(b) by 219 days.

(21) Appl. No.: 10/598,284

(22) PCT Filed: Mar. 4, 2005

(86) PCT No.: PCT/NO2005/000080

§ 371 (c)(1),
(2), (4) Date: Aug. 23, 2006

(87) PCT Pub. No.: WO2005/084778

PCT Pub. Date: Sep. 15, 2005

(65) Prior Publication Data

US 2008/0168753 A1     Jul. 17, 2008

(30) Foreign Application Priority Data

Mar. 5, 2004    (NO) .................................. 20040971

(51) Int. Cl.
*B01D 45/00* (2006.01)

(52) U.S. Cl. .............................. 55/343; 55/418; 55/442

(58) Field of Classification Search .................. 55/329, 55/423, 343, 418, 442
See application file for complete search history.

(56) References Cited

U.S. PATENT DOCUMENTS

| 4,767,424 | A | * | 8/1988 | McEwan ...................... 55/329 |
| 6,083,291 | A | | 7/2000 | Okada et al. |
| 7,144,437 | B2 | * | 12/2006 | Christiansen et al. ......... 55/343 |
| 2005/0011170 | A1 | | 1/2005 | Christiansen et al. |

FOREIGN PATENT DOCUMENTS

| EP | WO 01/60478 | * | 8/2001 |
| FR | 1407326 | | 7/1965 |
| GB | 1119699 | * | 6/1966 |

* cited by examiner

*Primary Examiner*—Duane S Smith
*Assistant Examiner*—Sonji Turner
(74) *Attorney, Agent, or Firm*—Dennison, Schultz & MacDonald

(57) ABSTRACT

Vane diffuser for use in separators for separating a liquid phase and/or a particulate material from a gas flow, includes a distribution chamber that communicates with the inlet pipe stub of the separator. A top plate, a bottom plate, and a plurality of curved, parallel vanes together delimit a plurality of diffuser channels. Each of the vanes has a thickness which varies in the flow direction to ensure an even expansion of the cross-sectional area of the diffuser channels, thereby reducing reverse flow along the suction side of the vanes, as occurs with vanes of uniform thickness.

10 Claims, 4 Drawing Sheets

VANE DIFFUSER

Figure 1:
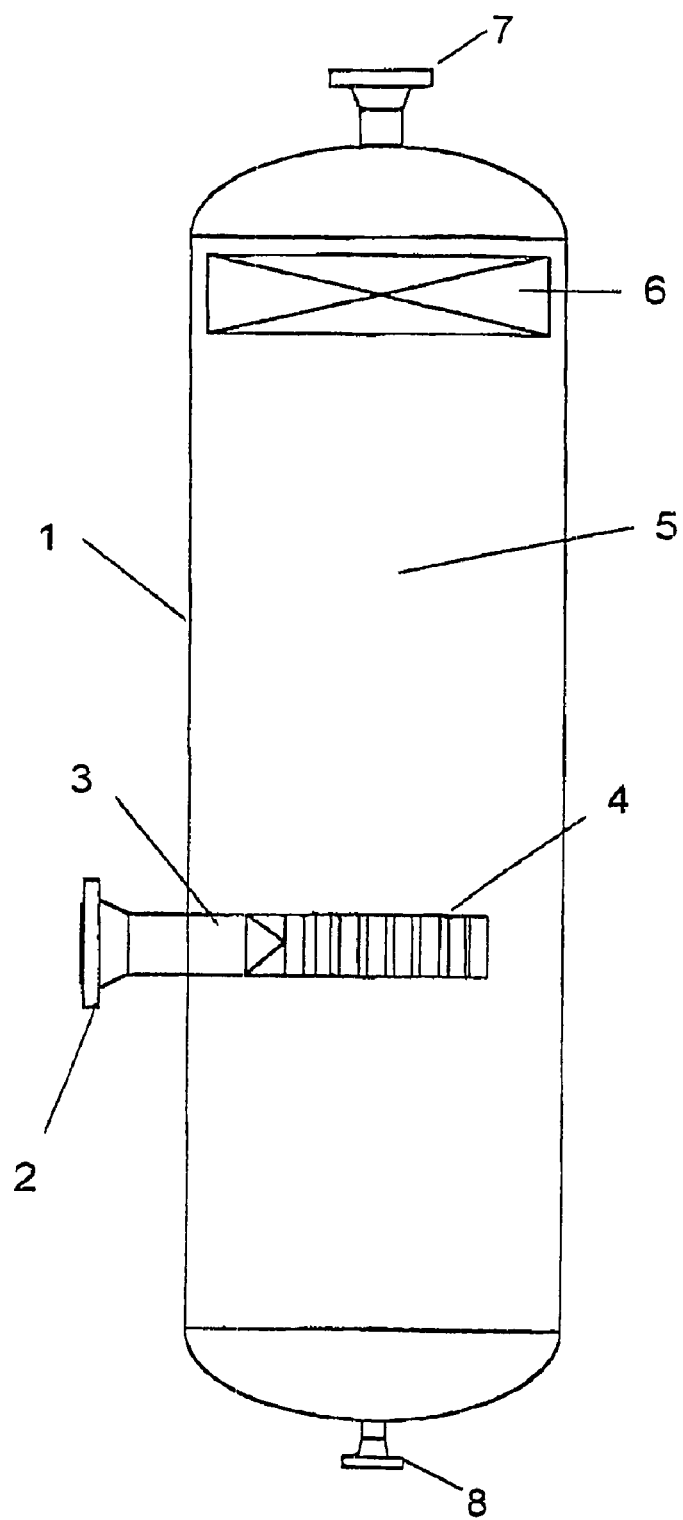

The present invention concerns separation of liquids from a gas flow, particularly in a process for the production of oil and gas. More specifically the present invention concerns a vane diffuser for use in separators used to separate a liquid phase and/or solid particulate material from a gas flow, comprising a bundle of parallel, curved vanes.

BACKGROUND

In the production of oil and gas from a subterranean or subsea reservoir, the production flow from the well will almost always contain oil, gas, water, and a little sand. Therefore, terminal plants are commonly arranged in order to separate the different phases of the well production flow from each other. The separation is conducted in several steps by which a coarse separation is effected by means of gravity alone and where fine separation is facilitated by means of centrifugal forces and inertial forces in combination with gravity. The separation is conducted in large separators that may be arranged either horizontally or vertically. Examples of different embodiments of separators according to prior art technology are found in PCT/NO02/00379 and in U.S. Pat. No. 6,083,291.

Several steps of separation may take place in a separator. First, the gas enters the separator through an inlet conduit which in the case of vertical separators may be localized at the middle of the separator's vertical extension. At the inlet a baffle plate, a vane diffuser, or the like, is commonly arranged in order to distribute the fluid flow over the separator's cross-section. At this stage, the larger liquid drops are already separated out and fall into a liquid reservoir in the lower part of the seperator.

The gas and remaining droplets continue upwards into what may be called a calm zone or settling zone in which additional droplets, due to gravity, fall into the liquid reservoir below, possibly subsequent to having been settled on the separator wall and drained down along the wall.

Close to the outlet conduit at the top of the separator, the gas is forced through droplet demisters of per se known technology in order to remove droplets that have not been removed by gravity.

It is very important that the inlet arrangement of the separator is appropriately designed, taking into consideration the separator's cross-sectional area, so that as much as possible of the liquid is separated out at this early stage, in order to avoid an excessive load of liquid into the droplet demisters. This consideration is particularly important for vertically arranged separators. Overload of demisters due to inadequately designed inlet arrangements and/or too small diameter for the separator compared to the gas flow rate is the main cause of problems encountered in a number of such installations. It is worth noting that in most vertically arranged separators the inlet arrangement relies upon gravitational forces alone to separate out liquid, which sets strict limitations to the maximum allowable flow rates of gas above which significant volumes of liquid will be drawn up to the demister equipment. Recently, different designs of cyclone inlet arrangements have been attempted in vertical separators, through some operational limitations still exist. The term "cyclone inlet arrangements"refers to designs by which the fluid charged to the separator is forced into a swirling motion so that a centrifugal force will act on the fluid in addition to gravity. PCT/NO02/00379 shows examples of different embodiments of cyclone inlet arrangements according to such prior art technology.

The most common inlet arrangement in gas scrubbers is denoted vane diffusers as also discussed in PCT/NO02/00379. Such a vane diffuser, known from Norwegian patent No. 164 960 and EP patent No. 195 464 is discussed in more detail with reference to FIG. 2 below. A vane diffuser is comprised of a vane arrangement arranged to reduce the fluid velocity in the inlet conduit before the fluid enters the separator. This is achieved by a plurality of parallel vanes that receive the inflowing fluid and divert the flow about 90 degrees to both sides. The parallel vanes together with a top plate and a bottom plate form channels which are curved and expand in the direction of the flow. Due to the fact that the curved vanes have even thickness in the direction of their length, it is difficult to make the fluid fill the entire flow channels. This is partly caused by a too abrupt expansion of the cross-section and partly caused by a pressure gradient across the flow direction that is a result of the curvature of the vanes. The highest pressure will be along the outer edge of each flow channel, also denoted the pressure side of the vane, while the lowest pressure is found along the inner edge of each flow channel, delimited by the adjacent vane's suction side. Therefore the theoretical available velocity reduction calculated from the cross-sectional area at the outlet of the diffuser is not achievable.

Due to inertial forces the majority of droplets will settle on the pressure side of the vanes and leave the vane's trailing edge in the form of a liquid film. Vane diffusers of prior art technology are not provided with any device to separate out any part of the entrained liquid from the gas before the fluids enter the separator.

SUMMARY OF THE INVENTION

It is thus an object of the present invention to provide a separator with a better efficiency of separation than provided by prior art separators, with a more efficient retardation of the inflowing fluids before the fluids enter the separator.

It is furthermore an object to achieve the above mentioned object with means that are simple, inexpensive and which may easily be adapted to existing separators.

The present invention concerns a vane diffuser for use in separators to remove liquid from a gas flow.

The vane diffuser according to the invention is provided with a plurality of parallel vanes arranged to receive the inflowing fluid and to divert the flow about 90 degrees to each side. The vane diffuser is provided with a top plate and a bottom plate. The parallel vanes together with the top and bottom plates form a plurality of curved channels the cross-section of which expand in the direction of the flow. A specifically novel feature is the profiled vanes, i.e. the vanes have a varying thickness in the direction of the flow.

When the vanes are profiled with an appropriately varying thickness in the direction of the flow, a smoother expansion of the diffuser channels' cross-section is obtained compared to vanes having a uniform thickness. As a result, a more efficient retardation of the gas velocity is obtained when the gas enters the separator, so that a more uniform vertical flow and thus a more efficient separation is obtained in the separator's settling zone, with an accordingly reduced risk of overloading the demister means at the top of the separator.

More specifically, by applying profiled vanes one seeks to avoid the formation of a reverse flow (whirlpool) of gas on the suction side of the vanes due to a too abrupt expansion of the cross-section of the diffuser channels. Problems related to reverse flow, also denoted flow separation, are well known for divergent, straight channels. For straight, diffuser channels flow separation occurs when the expansion angle exceeds 14 degrees. For a curved diffuser channel the challenge to avoid flow separation is larger since the transverse oriented pressure gradients associated with the curvature of the channel add to the problems.

The variation in vane thickness is evidently not arbitrary. The primary objective is as mentioned to ensure a smoothes possible expansion of the diffuser channels' cross-section. If the vane's length is defined along its centre line from its leading edge to its trailing edge, the maximum thickness of the vane according to the invention will be within 20-70% of the vane's length measured from its leading edge. The ratio between the maximum thickness of the vane and the vane length will typically be in the range 0.05-0.15.

In a preferred embodiment, the vanes are hollow with a cavity defined by each vane's pressure side and suction side together with the top and bottom plate. Due to the inertial forces the majority of droplets will settle on the vane's pressure side and form a liquid film thereon. Perforations or slots are arranged on the vane's pressure side so that the liquid film on this side is drained into the cavity of the vane. At the bottom of the vane, there is arranged an open passage thorough the bottom plate so the liquid accumulating in the vane cavity is drained further down to the underside of the vane diffuser where an accumulation space for liquid may be arranged, from which liquid is again drained down a channel down to the bulk liquid phase.

BRIEF DESRIPTION OF THE DRAWINGS

Below the invention is described in further detail in the form of a specific embodiment with reference to the drawings. For the sake of overview prior art technology is also shown by the drawings, where FIG. 1 is a diagrammatical sectional view of a separator with a prior art vane diffuser and demister equipment.

Figure 3A:
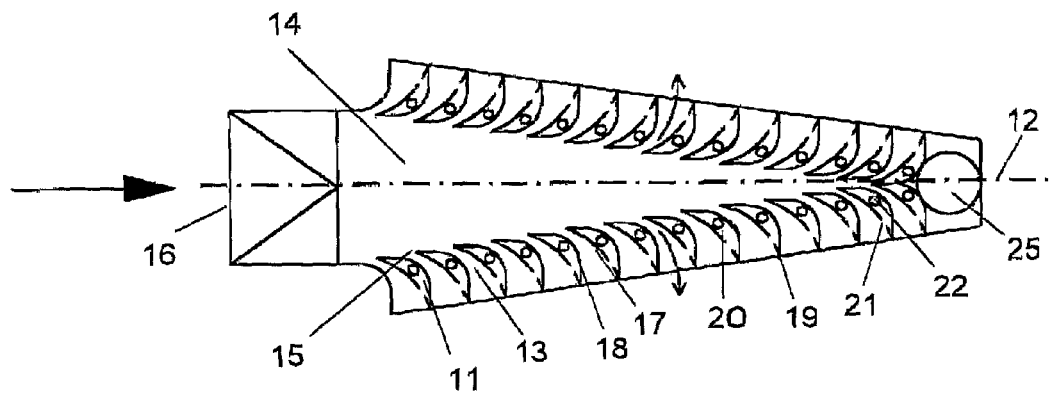
Figure 3B:
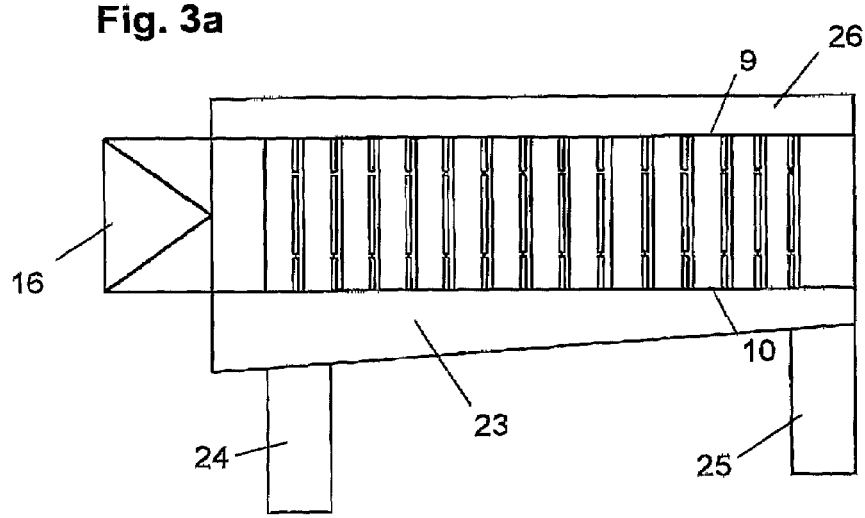
Figure 4:
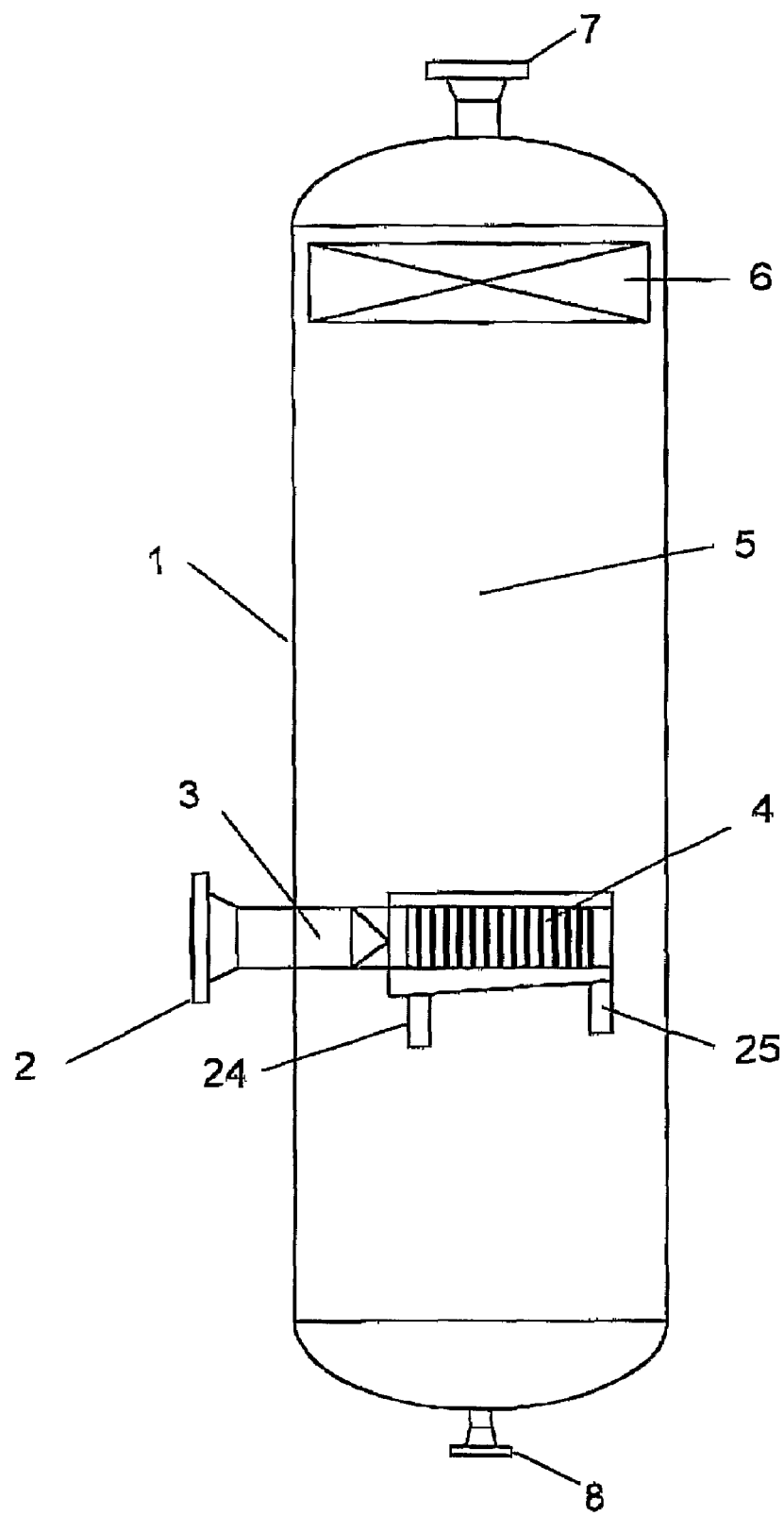

FIG. 2 is a diagrammatical sectional view of a prior art vane diffuser,

FIGS. 3a-b are diagrammatical sectional views of a vane diffuser according to the present invention, and FIG. 4 is a diagrammatical sectional view of a separator with a vane diffuser according to the present invention and demister equipment.

DESRIPTION OF THE PREFERRED EMODIMENTS

FIG. 1 shows a separator according to prior art technology comprising a tank 1, an inlet pipe stub 2, a communication channel 3 which communicates with a vane diffuser inlet assembly 4 which is intended to receive, retard and distribute inflowing gas and liquid from the pipe stub 2 as gently as possible into the separator's settling zone 5. The settling zone 5 is usually relatively small so settling of small droplets by means of gravity takes place only to in a quite limited extent. It is therefore preferred that the vane diffuser 4 is designed in a manner to take out most of the liquid in the gas flow immediately after the latter enters the separator. This is not well taken care of in vane diffusers 4 according to prior art technology. The gas passing through zone 5 will hold many small and some medium sizes drops when entering the demister equipment 6 where additional liquid drops are separated out. The demisted gas is discharged from the separator through upper outlet pipe stub 7 while the separated liquid is discharged through lower outlet stub 8.

Figure 2A:
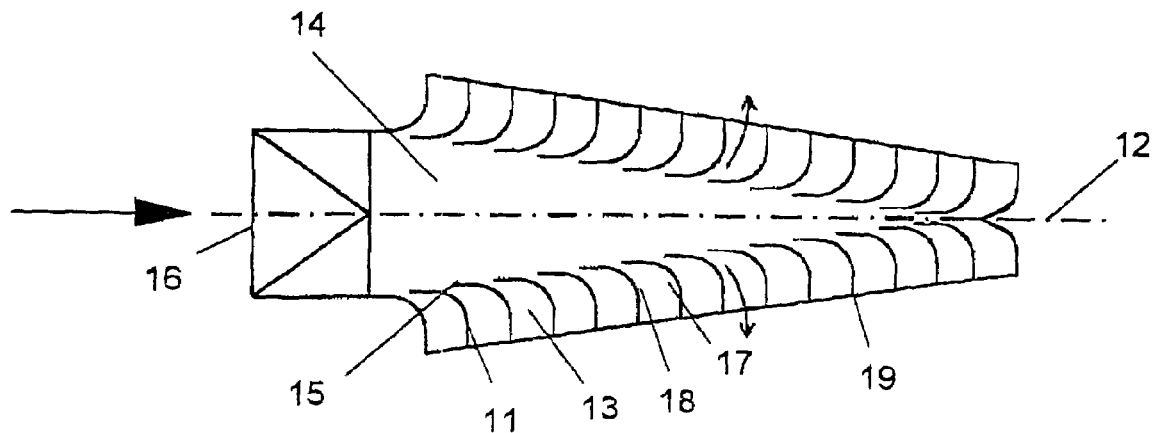
Figure 2B:
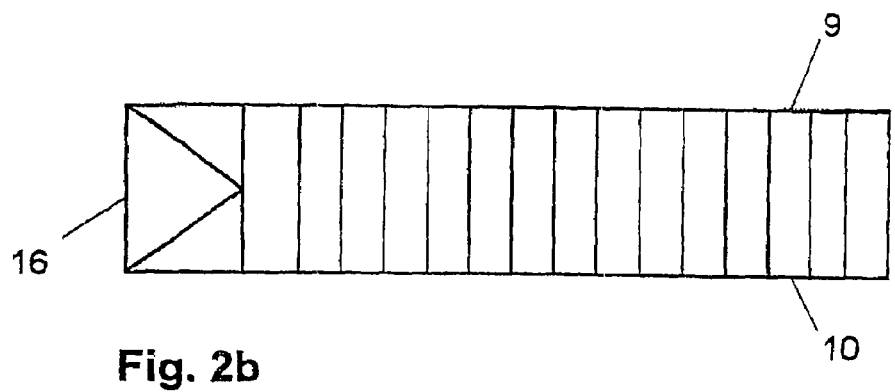

FIGS. 2a-b shows diagrammatically a sectional view of a vane diffuser according to prior art technology, such as discussed in EP patent No. 195 464. FIG. 2a shows a horizontal section of the vane diffuser while FIG. 2b shows a vertical section of the diffuser. The vane diffuser comprises a top plate 9, a bottom plate 10 and a plurality of parallel, curved vanes 11 arranged at each side of the vane diffuser's centre axis 12. The parallel vanes 11 together with the top plate 9 and bottom plate 10 form a plurality of channels 13, hereinafter denoted diffuser channels that expand and are curved in the flow direction. Along the diffuser channel's centre axis 12 there is a distribution chamber 14 that is delimited by the top plate 9, bottom plate 10 and by the leading edges 15 of the vanes 11. The vane diffuser's inlet 16 communicates with the separator's inlet pipe stub 2 through a communication channel 3. The vanes have a uniform thickness in the flow direction.

The inflowing fluid is charged into the distribution chamber 14 from the separator's inlet pipe stub 2 via channel 3. The fluid will from there be distributed and flow into the diffuser channels 13. Since the vanes 11 are comprised of curved plates with uniform thickness in the flow direction, it is difficult to make the fluid fill the entire diffuser channel. This is due to the fact that the cross-sectional area of the diffuser channel increases too abruptly and partly due to the pressure gradient across the flow direction that follows from the curvature of the vanes. The highest pressure is found along the outer edge of the flow channel, delimited by what is denoted the vane's 11 pressure side 17 while the lowest pressure is found along the inner edge of the flow channel, delimited by what is denoted the adjacent vane's suction side 18. As a consequence of the low pressure along the vane's suction side 18, there will be a reverse flow of fluid along this side so that the theoretical obtainable velocity reduction calculated from the cross-sectional area at the outlet of the vane diffuser is not obtainable. Due to inertial forces, the main quantity of liquid will settle on the pressure side 17 of the vane and leave the trailing edge 19 of the vane 11 in the form of a liquid film.

FIGS. 3a-b show diagrammatically sectional views of a vane diffuser according to a preferred embodiment of the invention. FIG. 3a shows a top sectional view of the vane diffuser while FIG. 3b shows a side sectional view of the same vane diffuser. The vane diffuser is comprised by a top plate 9, a bottom plate 10, and a plurality of parallel vanes 11 arranged along both sides of the centre axis 12 of the vane diffuser. The parallel vanes together with top plate 9 and the bottom plate 10 form a plurality of curved diffuser channels 13 that expand in the direction of the flow. Along the centre axis 12 of the vane diffuser there is a distribution chamber 14 that is delimited by the top plate 9, by the bottom plate 10, and by the leading edges 15 of the vanes 11. The vane diffuser's inlet 16 communicates with the separator's inlet pipe stub 2 through a communication channel 3. The vanes are profiled, which means that they have a varying thickness in the flow direction, which implies a more even expansion of the diffuser channel's cross-sectional area than is the case for vanes of a uniform thickness. The vanes 11 according to the illustrated embodiment are hollow with a cavity 20 delimited by the vane's pressure side 17, by the vane's suction side 18 top plate 9 and bottom plate 10. Perforations and/or slots 21 are arranged on the pressure side 17 of each vane so that liquid that settles on the pressure side 17 is drained into the vane cavity 20. At the bottom of each cavity 20 there is an open passage 22 through the bottom plate 10 so that accumulated liquid in the cavity 20 will be drained further down below the vane diffuser's bottom plate 10 and may be temporarily collected in an accumulation space 23 and from there drained via a channel 24 down to the bulk liquid phase.

It is preferred, but not a requirement, to also to arrange a draining channel 25 to drain liquid that might accumulate on top of the vane diffuser top plate 9. In such an arrangement it is preferred to let side walls 26 surround the entire circumference of the top plate 9 in order to prevent liquid accumulated thereon to run down in front of the outlet from the diffuser channels.

A functional description of the vane diffuser according to the present invention is given below.

The inflowing fluid is charged into the vane diffuser distribution chamber 14 from the separator inlet pipe stub 2 through a communication channel 3. The fluid will, from there, be distributed to the plurality of diffuser channels 13 on both sides of the distribution chamber centre line 12.

Since the vanes are profiled, i.e. that their thickness is conveniently varies in the flow direction, the cross-sectional area of the diffuser channels 13 is provided with an even expansion in the flow direction which implies that a reverse flow along the suction side 18 of the vanes is avoided. This is contrary to the situation for vanes with uniform thickness.

Due to the curvature of the diffuser channels inertial forces will imply that the main quantities of liquid drops settle on the vanes' pressure sides 17 and form a liquid film thereon. Perforations and/or slots 21 are arranged in the pressure side 17 of the vanes so that liquid settled thereon will be drained into the vane cavity 20. At the bottom of each cavity 20 there is an open passage 22 through the bottom plate 10 so that accumulated liquid in the cavity will be drained further down below the vane diffuser's bottom plate 10 and may be temporarily collected in an accumulation space 23 and from there drained via a channel 24 down to the bulk liquid phase.

FIG. 4 depicts a separator with a vane diffuser according to the invention, comprising a tank 1, an inlet pipe stub 2, and a communication channel 3 which communicates with the vane diffuser inlet. The vane diffuser is intended to remove all of or part of the entrained liquid from the gas and to distribute inflowing gas and remaining liquid not separated out in the vane diffuser as lenient as possible into the separator 1, settling zone 5.

Due to the profiled design of the vanes there will, as mentioned, be achieved a more efficient retardation of the gas velocity when the gas is distributed into the settling zone 5. This leads to a more uniform vertical flow and thereby a more efficient separation in the separator' settling zone 5, with associated reduced risk of overloading the demisting equipment at the top of the separator.

With the preferred feature that the vanes are hollow with an inlet in the form of perforations or slots in their pressure side, an additional advantage is achieved as liquid is separated out from the gas flow already at the inlet, implying less liquid to be separated out in the settling zone 5 with correspondingly less risk of overloading the demisting equipment at the separator top.

What is claimed is:

1. Vane diffuser for placement in a separator for separating at least one of a liquid phase and particulate material from a gas flowing through the vane diffuser in a flow direction, the vane diffuser comprising:
   a top plate;
   a bottom plate;
   a plurality of curved, parallel vanes disposed between the top plate and the bottom plate and defining diffuser channels therebetween, each of said vanes having a thickness which increases continuously in the flow direction to a maximum, then continuously decreases resulting in a cross sectional area of the diffuser channels which expands evenly, said diffuser channels leading to an outlet in the flow direction; and
   a distribution chamber delimited by the top plate, the bottom plate and the plurality of curved, parallel vanes, the distribution chamber having means for communicating with an inlet pipe stub of the separator to admit the gas into the vane diffuser and the outlet therefrom.

2. Vane diffuser as claimed in claim 1, wherein each of the vanes is defined by a leading edge, a trailing edge and a center line from the leading edge to the trailing edge and having a length which defines vane length, and
   wherein the each of the vanes has a maximum thickness which is from 20 to 70% of the vane length.

3. Vane diffuser as claimed in claim 1, wherein each of the vanes is defined by a leading edge, a trailing edge and a center line from the leading edge to the trailing edge and having a length which defines vane length, and
   wherein each vane has a ratio of maximum thickness to vane length of 0.05-0.15.

4. Vane diffuser as claimed in claim 1, wherein each of said vanes has a cavity that communicates with a pressure side through perforations or slots, to allow thereby at least a portion of any liquid or particulate material settling on the pressure side to flow into said cavity and below the vane diffuser through a passage in the bottom plate.

5. Vane diffuser as claimed in claim 1, wherein an accumulation space for liquid flowing through a passage in the vane diffuser is arranged below the bottom plate.

6. Vane diffuser as claimed in claim 5, additionally comprising a channel arranged to drain liquid from the accumulation space.

7. Vane diffuser as claimed in claim 1, additionally comprising side walls arranged circumferentially around the of the top plate, such that any accumulation of liquid runs down in front of the outlet of the diffuser channels.

8. Vane diffuser as claimed in claim 7, additionally comprising a draining channel constructed and arranged to drain liquid accumulated on the top plate.

9. Vane diffuser as claimed in claim 1, wherein the diffuser channels are arranged to have an expanding cross sectional area to reduce gas flow velocity between the distribution chamber and the outlet, the cross sectional area adjacent the distribution chamber being less than the cross sectional area the outlet.

10. A separator for separating at least one of a liquid phase and particulate material from a gas flowing in a flow direction, the separator comprising:
    a separation tank comprising an inlet pipe stub to admit the flowing gas into the tank, a lower outlet for discharge of a heavier separated fraction, and an upper outlet for discharge of a lighter separated fraction; and
    a vane diffuser arranged within the tank for retarding and diverting flowing fluid upon entry into the tank, the vane diffuser comprising:
    a top plate;
    a bottom plate;
    a plurality of curved, parallel vanes disposed between the top plate and the bottom plate and defining diffuser channels therebetween, each of said vanes having a thickness which increases continuously in the flow direction to a maximum, then continuously decreases resulting in a cross sectional area of the diffuser channels which expands evenly, said diffuser channels leading to an outlet from the vane diffuser in the flow direction; and
    a distribution chamber delimited by the top plate, the bottom plate and the plurality of curved, parallel vanes, the distribution chamber having means for communicating with the inlet pipe stub of the separator to admit the gas into the vane diffuser and the outlet therefrom.

* * * * *